United States Patent
Bach et al.

[19]

[11] Patent Number: 6,149,716
[45] Date of Patent: Nov. 21, 2000

[54] METHOD OF CLEANING A FILTER UNIT, AND A FILTER UNIT FOR FILTERING GAS

[75] Inventors: Poul Bach, Birkerød; Henning Birger Møller, Lynge; Nicolai Pipper, Copenhagen, all of Denmark

[73] Assignee: Niro A/S, Soborg, Denmark

[21] Appl. No.: 08/973,149

[22] PCT Filed: Oct. 31, 1997

[86] PCT No.: PCT/DK97/00495

§ 371 Date: Sep. 21, 1998

§ 102(e) Date: Sep. 21, 1998

[87] PCT Pub. No.: WO98/00001

PCT Pub. Date: Jan. 8, 1998

[51] Int. Cl.⁷ .......................... B01D 29/11; B01D 29/52; B01D 29/68
[52] U.S. Cl. ................ 95/280; 95/281; 55/283; 55/302; 55/341.1; 96/233; 96/428
[58] Field of Search .................. 55/283, 291, 302, 55/301, 341.1; 96/228, 233, 425, 428; 95/281, 280

[56] References Cited

U.S. PATENT DOCUMENTS

| | | | |
|---|---|---|---|
| 3,568,415 | 3/1971 | Wyrough | 55/302 |
| 4,500,435 | 2/1985 | Müller | 210/333.01 |
| 4,512,789 | 4/1985 | Pettit et al. | |
| 4,731,100 | 3/1988 | Loeffelmann et al. | |
| 5,167,676 | 12/1992 | Nakaishi et al. | 55/302 |
| 5,766,281 | 6/1998 | Luy et al. | 95/281 |
| 5,795,359 | 8/1998 | McLeish et al. | 55/302 |

FOREIGN PATENT DOCUMENTS

| | | |
|---|---|---|
| 0 182 000 A2 | 5/1986 | European Pat. Off. . |
| 0 382 097 | 8/1990 | European Pat. Off. . |
| 0 572 356 A1 | 12/1993 | European Pat. Off. . |
| 0 719 577 A2 | 7/1996 | European Pat. Off. . |
| 81 06182 | 10/1981 | France . |
| 2 702 672 | 9/1994 | France . |
| 25 21 828 | 11/1976 | Germany . |
| 40 29 804 C1 | 9/1994 | Germany . |
| 44 43 632 A1 | 6/1996 | Germany . |
| 5-49902 | 3/1993 | Japan . |
| 97/14288 | 4/1997 | WIPO . |
| 795/93 | 7/1999 | WIPO . |

OTHER PUBLICATIONS

"Cleaning–In–Place (CIP) Nozzle", Niro Brochure—Printed in Denmark.

*Primary Examiner*—Duane Smith
*Assistant Examiner*—Robert A. Hopkins
*Attorney, Agent, or Firm*—Sughrue, Mion, Zinn, Macpeak & Seas, PLLC

[57] ABSTRACT

A filter unit (1) has a plurality of filter elements (7) extending from a plate (6, 32) which divides the unit into a lower inlet side (9) for gas carrying product and an upper outlet side (8) for filtered clean gas. A cleaning-in-place of the filter elements is performed by supplying cleaning liquid in a sequence of several separate liquid pulses which are mixed with the pressurized gas pulses. The ejection of the individual pulse of pressurized gas is initiated at the earliest simultaneously with or after initiation of ejection of the corresponding pulse of cleaning liquid.

23 Claims, 7 Drawing Sheets

METHOD OF CLEANING A FILTER UNIT, AND A FILTER UNIT FOR FILTERING GAS

BACKGROUND OF THE INVENTION

The present invention relates to a method of cleaning a filter unit of the type comprising a plurality of filter elements extending from a plate dividing the unit into a lower inlet side for gas carrying product and an upper outlet side for filtered gas. During cleaning-in-place of the filter elements in between periods of operation of the filter unit a cleaning liquid and pulses of pressurized gas are mixed on the outlet side of the filter element and supplied to the interior of the filter element.

Such a method is disclosed in WO 97/14288 which describes a spray drying apparatus with an integrated filter unit. During operation of the apparatus pressurized gas is supplied from the outlet side of the filter unit by means of nozzles placed immediately above the openings of the filter elements in reverse flow to the interior of the filter elements in order to prevent excessive product build-up on the external filter surface. In addition the filter elements are cleaned between periods of operation by supplying a cleaning liquid through nozzles to the interior of the filter elements. To promote the distribution of the cleaning liquid over the entire internal surface of the filter walls the cleaning liquid is mixed with pulses of pressurized gas. The cleaning of the filter elements from the inside may be assisted by a simultaneous washing of the external side of the filter elements.

Danish Patent Application DK 795/93 describes a method of cleaning porous filter elements of the type used for removing particles from a process gas. The filter unit may be external to or integrated in a drying, granulating, coating or spray drying device. Between periods of operation, cleaning liquid is supplied to and distributed over the internal filter surface by means of circular channels arranged at the outlet side of the filter unit around the openings of the filter elements. At the same time pulses of pressurized gas, such as air, are supplied through nozzles to the interior of the filter elements in order to support the cleaning effect. The cleaning liquid can also be supplied by means of nozzles. During operation the filter unit is cleaned by supplying reverse flow pulses of pressurized gas to the filter elements.

U.S. Pat. No. 4,731,100 describes a method of cleaning a gas filtering apparatus between periods of operation. A plurality of filter elements are vertically suspended in a plate and they can be washed on the product side by several radially displaced spray nozzles directing cleaning liquid to the external surface of the filter elements, and on the outlet side for filtered gas by spray nozzles placed inside the filter elements. When washing is effected the spray nozzles are displaced vertically in order to wash the suture filter surface. The cleaning effect can be intensified by switching on a conventional pneumatic cleaning system during the washing of the filter elements. The displaceable nozzles make the system complicated and time consuming to operate.

From FR-A 2702672 it is known to have a filter unit which is divided by a plate carrying filter elements and has liquid nozzles positioned in the plate between the elements in order to spray water out horizontally onto the surface wall of the elements.

The known methods of cleaning filters when not in operation suffer from several disadvantages, the major one being a requirement for large flow rates of cleaning liquid in order to obtain filters cleaned to a satisfactory degree before they once again are set in operation. The high flow rates have been obtained by using excessively large quantities of liquid or by recycling collected cleaning liquid with the consequence that small product particles dispersed in the cleaning liquid are transferred to the clean outlet side. The flow rate of cleaning liquid in the prior art filters is typically larger than 500 liters per hour per square meter of filter wall surface. The total amount of liquid spent in one cleaning-in-place operation with prior art systems using recirculation is typically in the order of 30 to 50 liters per square meter of filter wall surface for each cleaning step and, typically, at least 3 to 6 cleaning steps are required in these prior art methods using recycling.

SUMMARY OF INVENTION

The present invention aims at reducing the amount of cleaning liquid required to perform a cleaning of the filter elements between periods of operation.

In view of this the method according to the invention is characterized in that during the cleaning-in-place operation the cleaning liquid is supplied in a sequence of several separate liquid pulses which are mixed with the pressurized gas pulses into common pulses of gas and cleaning liquid by initiating the ejection of the individual pulse of pressurized gas at the earliest simultaneously with or after initiation of ejection of the corresponding pulse of cleaning liquid.

Supplying the cleaning liquid in separate pulses into the filter elements in the reverse flow direction results in a considerable saving in consumed liquid. The mixing of the two pulses into a common pulse in such a manner that the liquid pulse is issued from the supply source, or at least its discharge has begun, before another supply source initiates discharge of the gas pulse gives the advantage that all the liquid injected to a mixing area is effectively mixed into the gas and is then delivered to the filter wall in a relatively short pressure pulse.

The method according to the invention produces a surprisingly high cleansing effect of the cleaning liquid utilized, which allows for a drastic reduction of the liquid amount used for a complete cleaning operation. Due to the complex fluid dynamic situation involving 3-dimensional two-phase flow mixing under dynamic and fully transient conditions, the synergetic effect of pulses supplying both the liquid and the gas and by withholding the gas pulse in relation to the corresponding liquid pulse can not be readily explained, but is assumed to be a result of a mixing into a common pulse with a favourably even dispersion of the liquid into the gas.

Naturally it is possible to use several liters of liquid for each pulse, especially if the filter element is large with a filter wall surface of more than one square meter. However, in a preferred method the amount of cleaning liquid ejected during each separate liquid pulse is less than 1 liter. This small amount of liquid is finely dispersed in air and can quite surprisingly subject a filter wall surface of several square meters to an effective cleansing effect. It is even more preferable to use less than 0.5 liter cleaning liquid for each pulse because this allows the filter unit to be designed with suitably small nozzle devices above the filter elements.

In order to obtain the desired cleanliness of the filter more pulses have to be used. The required number of pulses depends on the type of filter and of the kind of product filtered off from the process gas. Some products may require many pulses and thus a water consumption of e.g. 15 liters per square meter filter wall. However, it is preferred that the aggregate amount of cleaning liquid pulsed into the filter elements during a complete cleaning-in-place operation is at the most 10 liters per square meter of cleaned filter wall surface. This provides a considerable saving in cleaning liquid, and in case of a contaminent product less amounts of waste liquid needs to be purified. An even larger advantage can be obtained by suitably keeping the amount of cleaning liquid pulsed into the filter elements on less than 5 liters per square meter.

It will normally be fully sufficient if the ejection duration of each pulse of cleaning liquid is at the most 5 seconds. Although it is possible to use more extended pulses such as of 10 seconds, the upper limit of 5 seconds will do for most practical applications because cleaning liquid is saved by using more pulses of considerably shorter duration than by using fewer long pulses. Even in case of sparingly soluble products it is often preferable to issue a short pulse and then to wait some minutes before issuing the next pulse in order to let the cleaning liquid act on the product during the interval between the pulses.

In order to further save cleaning liquid the duration of each pulse of cleaning liquid is suitably kept within the range of 0.05 to 1 second. This short liquid pulse makes it possible to initiate the gas pulse after termination of the liquid pulse and yet obtain the desired mixing into a common pulse. This is of special advantage in filter units having main supply lines that are simultaneously open to several nozzle devices, because the pressurized gas supplied to the nozzle devices is prevented from flowing backwards into the liquid main line when this has resumed its closed state at the termination of the liquid supply to the devices.

The duration of each liquid pulse can even more preferably be in the range of 0.1 to 0.5 second as the upper limit of 0.5 second ensures that the major portion of the liquid is passing into or through the wall material in an approximately evenly distributed manner due to the pulse mixing.

The mass of cleaning liquid in a single liquid pulse is preferably kept within the interval of 0.75 to 8 times the mass of gas in the corresponding gas pulse as this on the one hand provides for an appropriately dense dispersion of liquid in the common pulses and on the other hand provides the common pulse with an amount of kinetic energy that produce a good distribution of the pulse over the area to be cleaned.

Due to its low liquid consumption the method according to the invention makes it possible to avoid waste of product cleaned off the filter elements. It is preferred that the cleaning liquid after having passed through the filter elements is collected, and the product cleaned from the filter is reclaimed or utilized. If the product type so allows, the product can be reclaimed. This is, inter alia, relevant for a filter unit used in a spray drying apparatus for making dyes or other non-edible products. The spent cleaning liquid can be returned to the liquid feeding system for the spray dryer. If the filter unit is part of a spray drying system for pharmaceuticals it may also be allowable to return the collected liquid to the feed side of the spray dryer at a point downstream of the last formulation step, but upstream of the last product cleaning step. It may in certain cases be permitted in a plant for processing foodstuffs to return the collected liquid to an earlier processing step, such as to the feed side of a milk spray dryer. Even in case it is not permitted to make such return, the collected liquid can, due to its high contents of product, be utilized as a separate produce, such as fodder for livestock.

It is preferred that the collected cleaning liquid includes at least 2 percent by weight of product cleaned from the filter. This is sufficient to allow for an economically viable reuse or reclaimation of the product, resulting in benefits for both the operator of the plant with the filter unit and for the environment. In comparison, the waste liquid from prior art filter units typically include at the most 0.2% by weight of dry matter, and this is so little as to render the waste liquid useless for practical purposes. Furthermore it is expensive to dispose of the waste liquid because of the large amounts of liquid spent. In an even more advantageous method according to the invention the collected cleaning liquid includes at least 4 percent by weight of filtered off dry matter.

The low consumption of cleaning liquid further gives the possibility of operating the filter unit in such a manner that only fresh cleaning liquid is used as liquid pulsed into the filter on its outlet side during the entire cleaning-in-place operation. By doing so recycling of used cleaning liquid to the clean outlet side for filtered gas is completely avoided which is a major advantage when cleaning-in-place is also to be performed on the outlet side in order to obtain a very clean filter unit. The recycling commonly used in prior art filters brings the disadvantage that small product particles are entering the filter material from the clean outlet side via the recycled cleaning liquid. Thus a certain amount of old product material is present in a newly cleaned filter. This is avoided by using the latter method according to the invention which makes this method preferable in case the product filtered off is required to have a very high and uniform standard, or if the filter unit is cleaned for switching to filtration of another product.

The amount of cleaning liquid required to complete a cleaning-in-place operation of course depends on the amount of product deposited in or clinging onto the filter wall at the beginning of the cleaning operation. Measures reducing this amount of product assist in obtaining the desired low consumption of liquid. In a further development of the invention cleaning is performed during operation of the filter unit by supplying first pulses of pressurized gas from the outlet side of the filter to the interior thereof, and by supplying through nozzles positioned in between the filter elements at the plate dividing the unit secondary pulses of pressurized gas from the inlet side to the exterior of the upper ends of the filter elements. It is well-known that the first pulses by their reverse flow action reduce the amount of product on the filter elements so that the pressure drop across the filter elements is maintained at an acceptable level.

The secondary pulses of pressurized gas flow in the same direction as the process gas to be filtered, but surprisingly they nevertheless act to keep product from accumulating on the filter elements. During normal filtration product may accumulate at the top end of the filter elements where the reverse flowing first pulses of gas have problems in loosening the product particles from the filter wall, and product particles will furthermore be deposited on the lower side of the plate carrying the filter elements. The product particles may have a tendency of building up cakes of deposits of a thickness that prevents flushing away of the deposits when subjected to the action of cleaning liquid. When wetted by cleaning liquid a surface layer of the deposits tends to encapsulate the underlaying deposits and prevent these from being cleaned off. By applying the secondary pulses of gas during normal operation of the filter unit the deposits on the lower side of the plate and in the top end of the filter elements are blown away or reduced in thickness to the extent that the deposits can readily be washed away by the cleaning liquid. The gas used can e.g. be air, an inert gas, a conditioned gas or steam.

Preferably, the secondary pulses are supplied in a sequence controlled independently of the sequence of first pulses. This simplifies the control and allows the frequency of the secondary pulses to be set according to the tendencyof the current product to build up deposits. However, it may be possible to strengthen the cleaning action by supplying each of the secondary pulses concurrently with an associated first pulse.

During the actual cleaning-in-place operation a supplement of cleaning liquid can also be supplied from the inlet side to the exterior of the upper ends of the filter elements through nozzles positioned in between the filter elements at the plate dividing the unit, and for the sake of simplicity this cleaning liquid can be supplied through the same nozzles as supplies the secondary pulses of pressurized gas.

Remains of the cleaning liquid used during a cleaning-in-place operation can be left on the upper side of the plate dividing the unit. This liquid can prevent a complete cleaning of the filter unit or require use of labour to perform a manual cleaning or drying away of the liquid. In order to ease the cleaning and prevent use of further cleaning liquid the method according to the invention can include that substantially all cleaning liquid present on the upper surface of the plate dividing the unit after performing a cleaning-in-place operation is drained to the lower side of the plate by capillary effect of filter medium of the filter elements. The filter elements are almost permanently mounted in the plate, and the removal of the liquid by capillary effect is a very reliable manner of removal of the liquid remaining after the cleaning operation. When the liquid has been drained to the lower side of the plate it is evaporated from the filter material into the gas flowing through the filter elements.

The present invention furthermore relates to a filter unit for filtering gas, comprising a plurality of filter elements extending from a plate dividing the unit into a lower inlet side for gas carrying product and an upper outlet side for filtered gas, a plurality of nozzle devices arranged at the outlet side of the filter elements, a supply of cleaning liquid to the nozzle devices, and a supply of pressurized gas to the nozzle devices, the nozzle devices being positioned opposite gas outlet openings of the filter elements.

According to the invention the filter unit is characterized in that each nozzle device comprises a mixing chamber which has a gas inlet opening connected to the supply of pressurized gas and a cleaning liquid inlet opening, and which at the bottom end has an outlet opening directed towards the gas outlet opening of the associated filter element, and that the internal volume of the mixing chamber can accommodate at least half of the aggregate amount of cleaning liquid ejected during a liquid pulse.

One function of the mixing chamber is to retain liquid supplied by the liquid pulse until the gas pulse is supplied so that the two pulses are mixed into a common pulse. The mixing chamber gives more freedom in the timing of the supply of the gas pulse so that the two pulses need not coincide, and also the mixing itself is improved because it occurs at least partially in the confined chamber. The volume of the mixing chamber is sufficiently large to receive a significant portion of the full cleaning liquid pulse.

Filter units are made in various sizes ranging from small filters for test purposes or for pharmaceutical applications to very large industrial filters including hundreds of filter elements. It is preferred that a plurality of mixing chambers are connected to a main supply line for cleaning liquid and to a main supply line for pressurized gas, and that the cross-sectional area of the main supply line for cleaning liquid is larger than the total area of the cleaning liquid inlet openings. The filter unit design is simplified by connecting several of the mixing chambers to a single main line and the number of movable members, such as valves, is reduced which simplifies control of the unit. By making the cross-sectional area of the liquid main lines larger than the total area of the cleaning liquid inlet openings to the mixing chambers connected to the main line, the cleaning liquid will have a sufficient pressure at the last inlet opening on the line to cause ejection through that opening when the main line has opened for delivery of liquid pulses.

Although it is possible in case of smaller filter units to connect all mixing chambers to a single pair of main lines, it is preferable that the filter unit includes several pairs of main supply lines for cleaning liquid and pressurized gas, respectively, and that at the most 20 mixing chambers are connected to a pair of main supply lines. For a given number of filter elements the operating conditions in the mixing chambers and thus the cleaning effect on the associated filter elements become more even when more pairs of main lines are used. If more than 20 mixing chambers are connected to a pair of main lines, the mixing chambers positioned farthest away from the inlet side of the pair of mains will not function properly due to insufficient pressure supply, or the mixing chambers closest to said inlet side will malfunction due to excessive pressure supply.

In a constructionally very simple embodiment having high reliability the gas inlet and the liquid inlet openings of the mixing chambers are permanently open to influx from the main supply lines, and each main supply line includes a single control valve which opens or closes for all of the mixing chambers connected to that main supply line. Reliability is enhanced by the use of only one control valve per main line and the connection of the mixing chambers to the main lines can be made, e.g. by mounting the chamber onto the main line and providing the main line with a bore debouching in the chamber or by connecting the chamber to the main line via a piece of tubing. It is possible to provide the mixing chamber with a check valve at one or both connections to the main lines so that only influx to the chamber is permitted and not a return flow to the main line. However, it is normally preferred simply to have a flow passage that is permanently open to flows between the main line and the chamber because this is the most fast acting, reliable and simple design.

As mentioned above, advantages are obtained by supplying secondary gas pulses during operation of the filter unit. In an embodiment designed for this, gas nozzles are mounted at the plate dividing the unit at positions in between the filter elements, and in their open position the gas nozzle openings eject pressurized gas along the lower side of the plate towards the top portion of the filter elements on the inlet side. The gas ejected blows away product particles clinging to the lower side of the plate and to the top of the filter elements and counteracts formation of deposits which will have to be washed off during a cleaning-in-place operation.

In a further development wherein several gas nozzles are connected to a common supply line which can alternatively be connected to either a source of pressurized gas or to a source of pressurized cleaning liquid, the nozzles are also utilized to supply cleaning liquid during the cleaning-in-place operation. In a preferred embodiment the completion of a full cleaning-in-place operation is facilitated by designing the filter elements with capillary active filter wall material that is in open and unshielded contact with an area of the upper surface of the plate and is continuing down into the filter wall extending into the lower inlet side of the unit, and by making the upper surface of the plate free from barriers so that liquid has free flow access to the unshielded filter wall material. With this design, the cleaning liquid left on the upper surface will be transported by the filter elements to the lower side of plate. As an alternative design, the plate dividing the unit can be mounted in an inclined position so that the upper surface of the plate has a sufficient slope to cause the liquid to be drained off.

BRIEF DESCRIPTION OF THE DRAWING

Examples of the invention will in the following be described in further detail with reference to the accompanying very schematic drawings, in which.

DETAILED DESCRIPTION OF THE PREFERRED EMBODIMENTS

Figure 1:
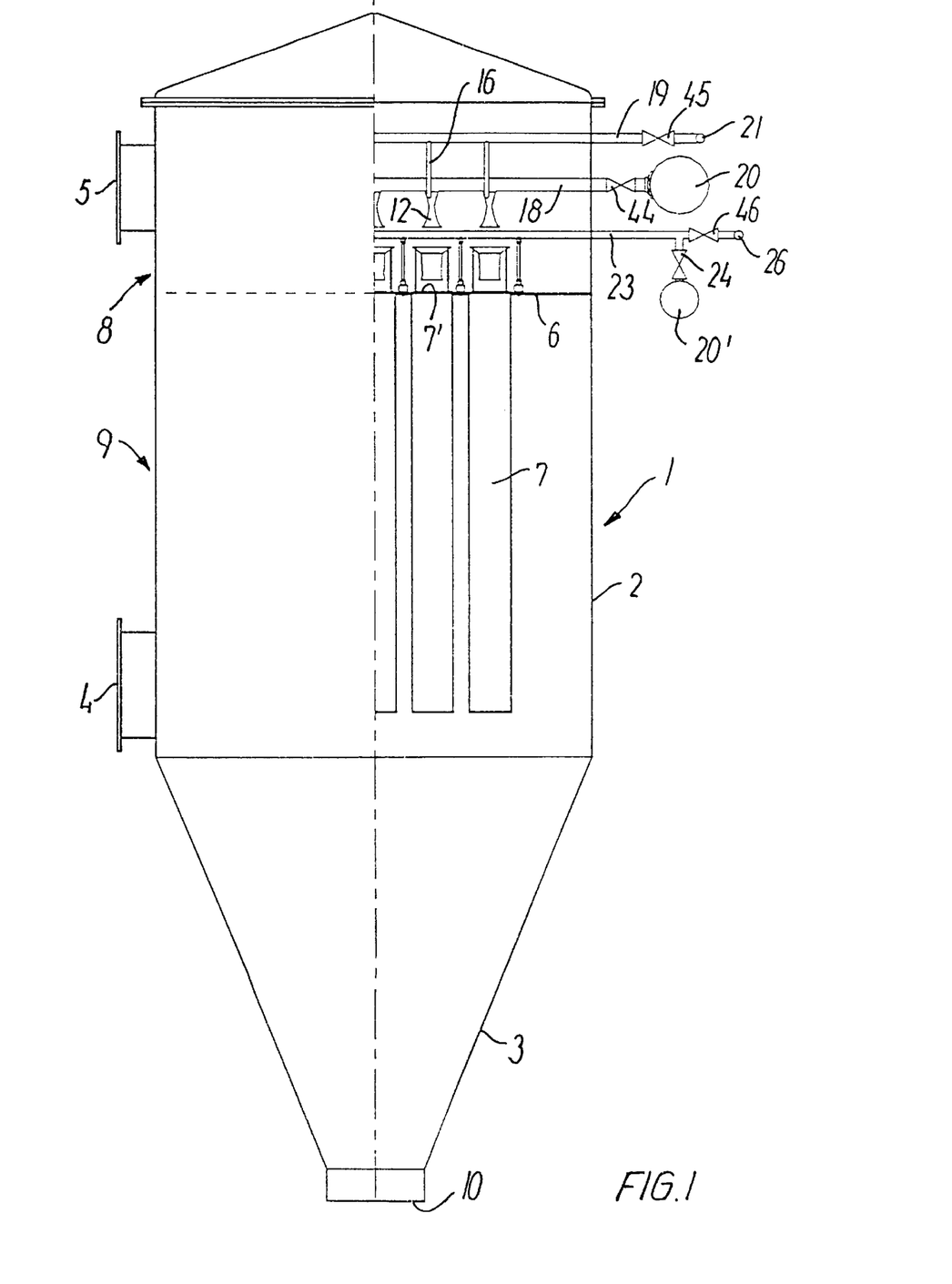
FIG. 1 is a part-sectional view of one embodiment of a filter unit according to the invention.

FIG. 1 shows a separate filter unit 1 according to the invention, which is employed for separating product particles from a process gas or scavenging air coming from a spray drying apparatus, a fluid bed apparatus, a drying apparatus, an agglomeration apparatus or the like using air or gas in the treatment of particulate or dustlike products. The products can be e.g. food-stuffs, diaries, pharmaceuticals, dyestuffs, chemical products etc, and some of the products may be poisonous or polluting. The process gas can be e.g. ambient air, heated air or gas, inert gas, such as $N_2$, special gas compositions inert to the products treated in the apparatus, superheated steam or conditioned air or gas.

The filter housing is composed of a vertically arranged cylindrical upper section 2 connected with a downward tapered lower section 3. An inlet 4 for gas carrying with it product to be filtered off is arranged in the lower part of the cylindrical section 2 and an outlet 5 for filtered clean gas is arranged in the upper part of section 2. At the bottom of the lower section 3 is arranged an outlet port 10 for the retained product.

A horizontal plate 6 dividing the housing in an upper outlet side 8 and a lower inlet side 9 is arranged in the upper part of the cylindrical section 2 below outlet 5. The plate 6 has a number of holes, in which elongated tubular filter elements 7 are suspended approximately vertically with their openings 7' opening upwards to the outlet side 8. The filter elements 7 can be bag-shaped and made of a filter wall material that can be a substantially soft material, such as a polymer felt or weave, supported by a basket in the interior of the bag, or can made from be a self-supporting substantially rigid porous material, such as metal, sintered or woven fibres, or ceramics.

During operation of the filter unit 1 gas carrying product enters from the inlet 4 and flows into the area around the filter elements on the lower inlet side 9 of the housing. The gas continues through the walls of the filter elements 7 and flows up to the upper outlet side 8 for clean filtered gas and eventually exits through the outlet 5. As the gas passes the filter walls product carried by the process gas is retained by the filter elements 7. The retained material is partially left on the filter elements and partially drops down and accumulates in the lower section 3. The accumulated product can then be extracted through the outlet port 10.

The filter unit can be made in a range of sizes. For, pharmaceutical use the filter unit may have from only a few filter elements with a total filter area of a few square meters to many filter elements with a total area of up until about 100 square meters. For diary use or industrial uses a larger sized filter unit normally has in the range of 50 to 500 filter elements with a total filter area in the range of 200 to 1000 square meters. The advantages of using the method according to the invention are growing with the size of the filter unit, up to a certain size. The individual filter element 7 has typically a length in the interval of 1–6 m and a diameter in the interval of 0.1–0.3 m.

Figure 2:
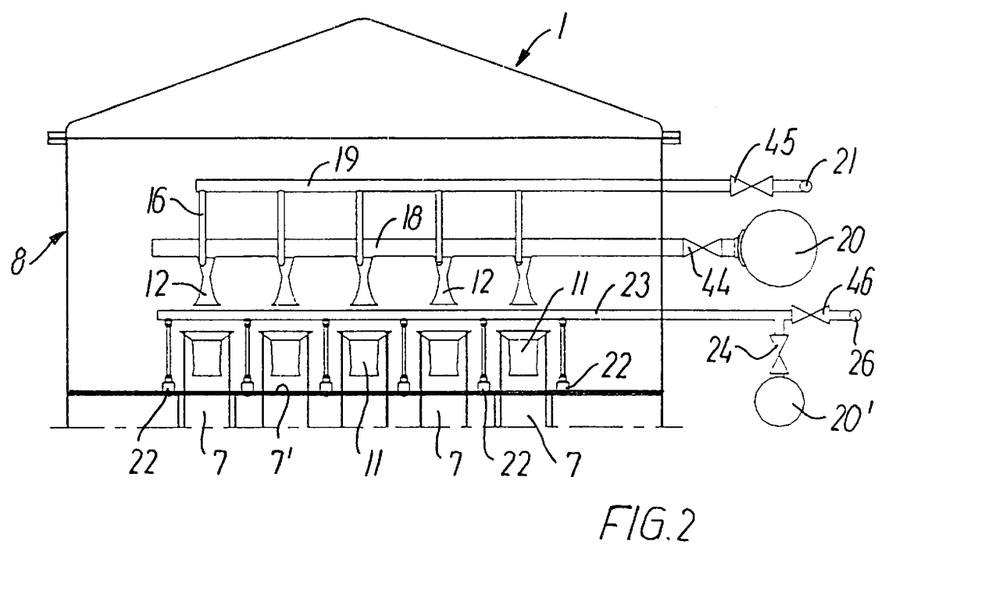
FIG. 2 is a sectional view of the upper part of the filter unit with nozzle devices.

FIG. 2 shows a slightly enlarged view of the upper outlet side 8. Five filter elements 7 are arranged in a row of holes in the plate 6. A so-called venturi tube 11 is arranged coaxially with and above the opening 7' of each filter element 7. The venturi tube 11 tapers towards the filter opening so that a fluid flow injected through the tube 11 is speeded up before entry to the interior of the filter element 7. A nozzle device for injection of fluid to the interior of the filter unit 7 is arranged above each venturi tube 11. In some filter units it may be possible to omit the venturi tube.

Figure 4:
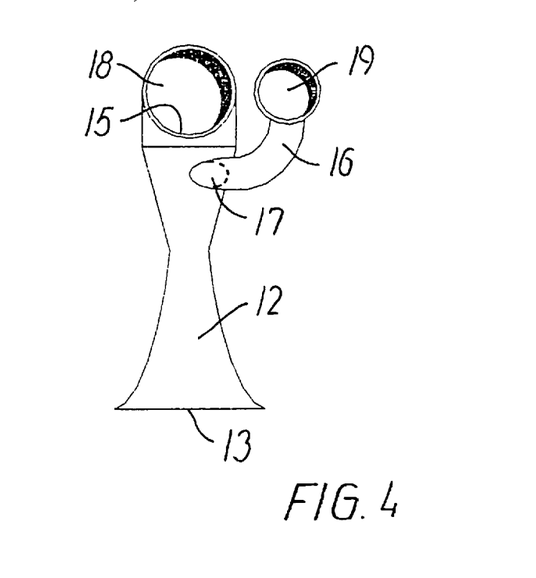
FIG. 4 shows one embodiment of the mixing chamber and main supply lines.

A mixing chamber 12, shown in further detail in FIG. 4, is hollow and has a lower outlet 13 facing venturi tube 11. The chamber can also be given other shapes than shown, e.g. spherical, ellipsoid, conical, turbinate, cylindrical, cube-shaped or box-shaped, or combinations of such shapes.

The mixing chamber is connected to a pressurized gas or air main supply line 18, e.g. by welding onto the pipe constituting the line, and an inlet opening 15 for the pressurized gas is made as a bore connecting the interior of the mixing chamber with the supply line. When air is admitted to supply line 18 a pulse of pressurized air flows through opening 15 into the mixing chamber 12. The air pulse which is admitted through opening 15, flows towards outlet 13 and achieves a flow direction aimed at passing through venturi 11 and down into the interior of the filter element.

A main supply line 19 for cleaning liquid is connected to the chamber 12 via a branch pipe 16 ending at a liquid inlet opening 17 below the top of the mixing chamber. When cleaning liquid is admitted to line 19 a pulse of liquid flows through opening 17 into the mixing chamber.

Figure 3:
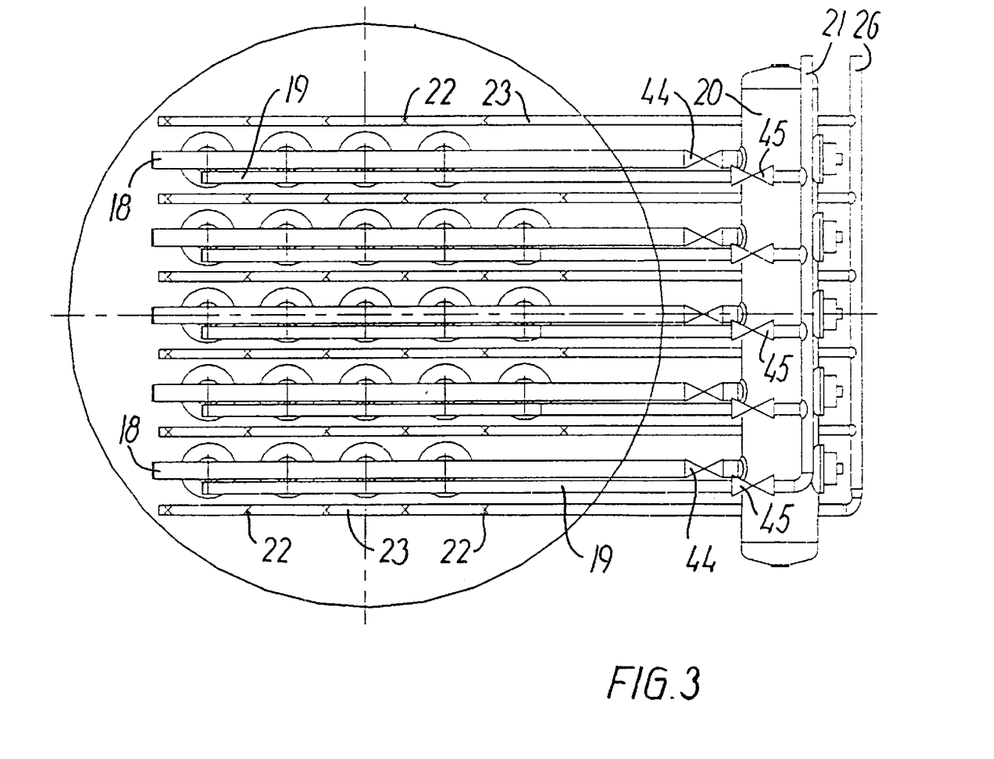
FIG. 3 is a sectional top view of the filter unit in FIG. 2.

FIG. 3 shows a top view of the upper outlet side 8 of the filter unit 1 according to FIG. 2. Five pairs of gas main supply lines 18 and cleaning liquid main supply lines 19 with associated nozzle devices are arranged above and parallel to five respective rows of filter elements 7 mounted in the plate 6. All air main supply lines 18 are fed with pressurized air from a common air pressure vessel 20 extending transverse to the lines 18 outside the housing of the filter unit 1. The air vessel 20 can be charged with air by means of a conventional air compressor.

A control valve 44 in each gas main supply line 18 controls the air delivery to the mixing chambers 12. When a pulse of pressurized air is to be injected into the mixing chambers mounted on the main supply line the control valve 44 is actuated to open position at the desired instant and for the desired duration of the gas pulse. Control valves 44 can be electronically actuated, e.g. by solenoid valves controlled by a central processing unit, or they can be activated by mechanical timers that can be manually set to the desired timing.

All cleaning liquid main supply lines 19 are fed from a common supply line 21 arranged above the air vessel 20. The supply of cleaning liquid to each of the lines 19 is likewise controlled by a control valve 45. When a pulse of cleaning liquid is to be injected into each of the mixing chambers connected to the individual line 19 the associated control valve 45 is actuated at the desired instant and for the desired duration of the liquid pulse. The means of actuation is preferably of the same kind as for control valves 44.

The operation of control valves 44 and 45 are synchronized to obtain the above mentioned mixing of the pulses into a common pulse. This is preferably done by opening for valve 45 for a duration determining the amount of liquid released into each mixing chamber, and by opening for valve 44 immediately after valve 45 has been closed, and thereby admit the gas pulse to the mixing chamber while the liquid is suspended or retained in the mixing chamber. Preferably, the allowance for delay in initiating the gas pulse is increased by adapting the inlet opening 17 to the shape of the mixing chamber so that the liquid is set up in a whirl motion in the mixing chamber. The increased allowance for delay makes the cleaning system more stable to fluctuations in the control system. The inlet opening can, for instance, be oriented to eject the inflowing liquid into the mixing chamber in a tangential flow direction that suitably can be oriented in a plane transverse to the longitudinal axis of the mixing chamber.

The cleaning liquid pulsed into the filter elements 7 during a cleaning-in-place operation pass the filter material and flows down into the bottom of the lower section 3 together with the washed off product, and is retracted via a liquid outlet and collected in a reservoir.

Air or gas nozzles 22 are mounted in the plate 6 on either side of the rows of filter elements 7 arranged in the plate 6. In FIG. 3 the gas nozzles 22 are indicated by crosses. On the lower inlet side 9 of the filter unit 1 the gas nozzles eject pressurized gas during operation of the unit in directions parallel to the surface of plate 6. The gas nozzles 22 are evenly distributed in between the filter elements 7 in such a manner that most of, or all, the filter elements are surrounded by four gas nozzles. When in the open state the gas nozzle 22 is adapted to radially direct an air flow along the lower side of the plate 6 and towards the top portion of the filter elements 7. In the intervals between issuance of the gas pulses the gas nozzles are typically adapted to be in the closed position by means of a return spring prestressing the movable valve body.

Figure 5:
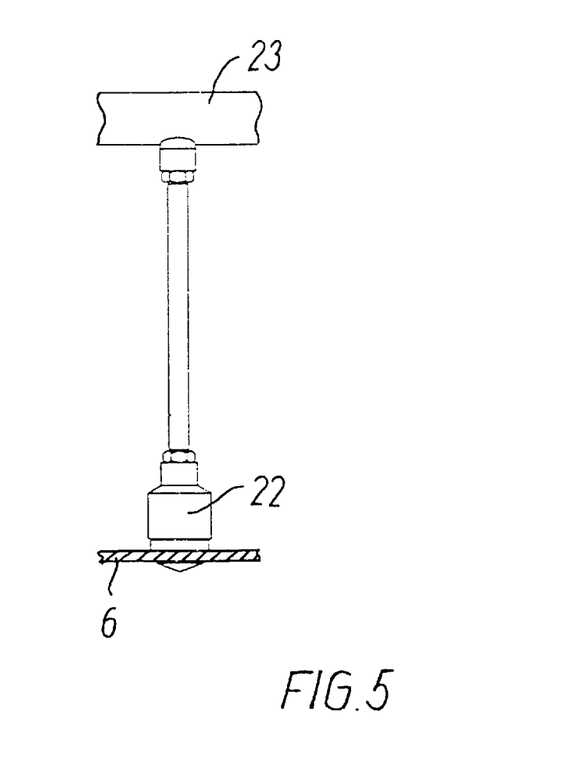
FIG. 5 shows an air nozzle mounted in the plate dividing the filter unit.

One of the nozzles 22 is shown in an enlarged view in FIG. 5. The nozzles 22 are fed from parallel main supply lines 23 extending above the rows of nozzles 22 and connected with a pressurized air vessel 20' via control valves 24. During a normal filtering operation first pulses of pressurized gas can be injected into the filter elements by the main lines 18 and the mixing chambers 12 but without supplying any cleaning liquid, and secondary pulses of pressurized gas can be ejected from nozzles 22.

The main supply lines 23 can furthermore be connected to a common supply line 26 for cleaning liquid to be used for a cleaning-in-place operation between periods of operation of the filter unit 1. For this purpose admission of liquid to each main supply line 23 is regulated by a control valve 46 which can be actuated in the same manner as control valve 44. The nozzles 22 can be of the automatically retractable type of the make Niro A/S, Denmark and the component name "Cleaning-in-Place (CIP) Nozzle".

Figure 6:
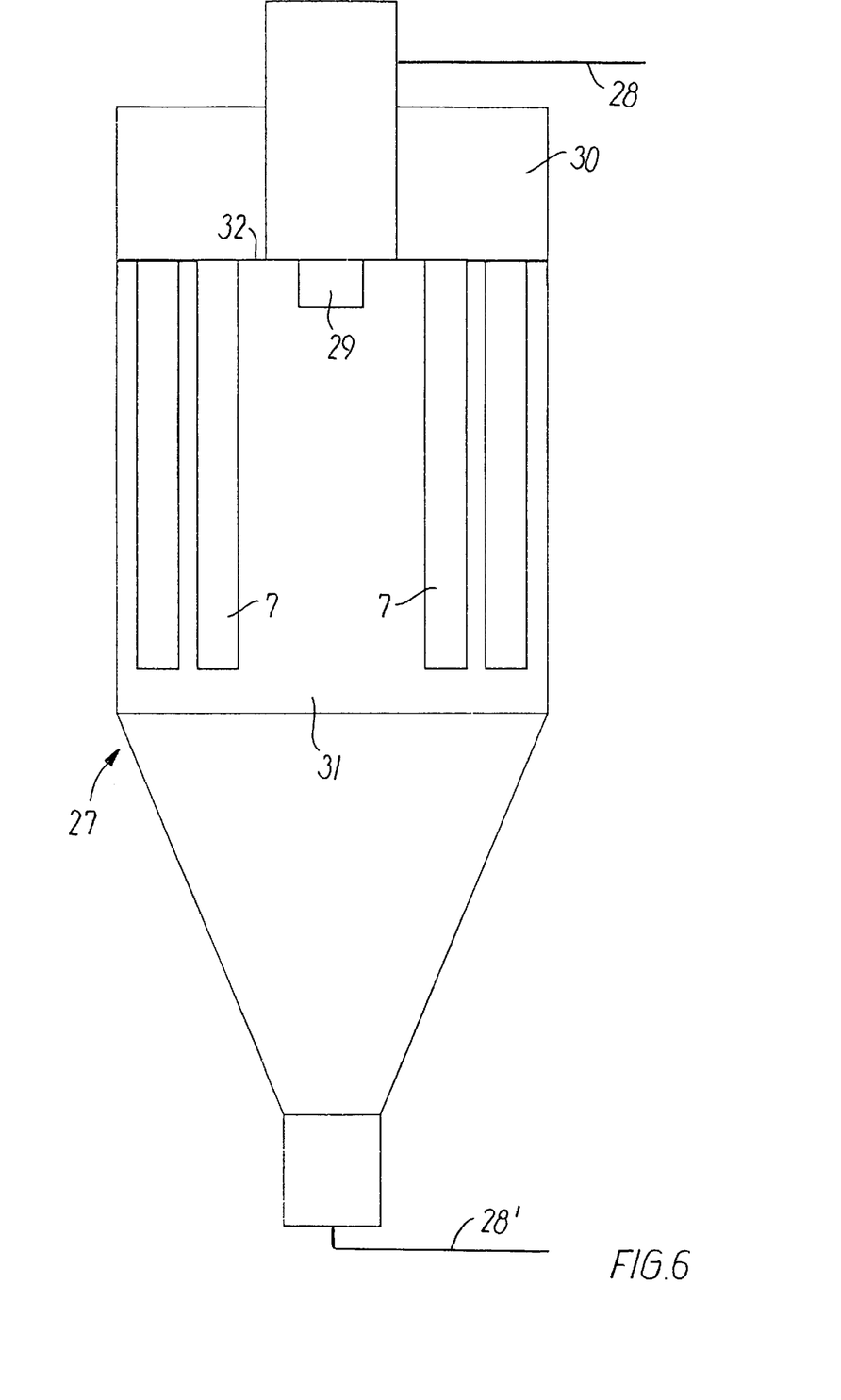
FIG. 6 outlines a filter unit integrated in a spray drying apparatus.

The filter unit 1 can, as an alternative to being a separate unit connected to a gas outlet for processing gas, be integrated into the processing unit, such as a spray drying apparatus 27, a fluid bed drying apparatus or the like, as shown in FIG. 6.

Drying gas is introduced from a supply line 28 and secondary gas from a supply line 28' to an integrated fluid bed and the product is supplied by a spray drying device 29 arranged centrally in a top plate 32 of a processing chamber 31. The plate 32 divides the integrated filter unit into the upper outlet side 8 and the lower inlet side 9 constituted by the processing chamber 31. A plurality of filter elements 7 are arranged in groups around the spray drying device and extend from this plate 32 in the same manner as described above in connection with FIGS. 1–3. The drying gas exits the processing chamber 31 through filter elements 7 and filtered off product is removed from the lower end of the processing chamber. The chamber 30 on top of the spray drying apparatus 27 constitutes the upper outlet side 8 of the filter unit and is with respect to the groups of filter elements designed along the same lines as described with reference to FIG. 2.

Figure 7:
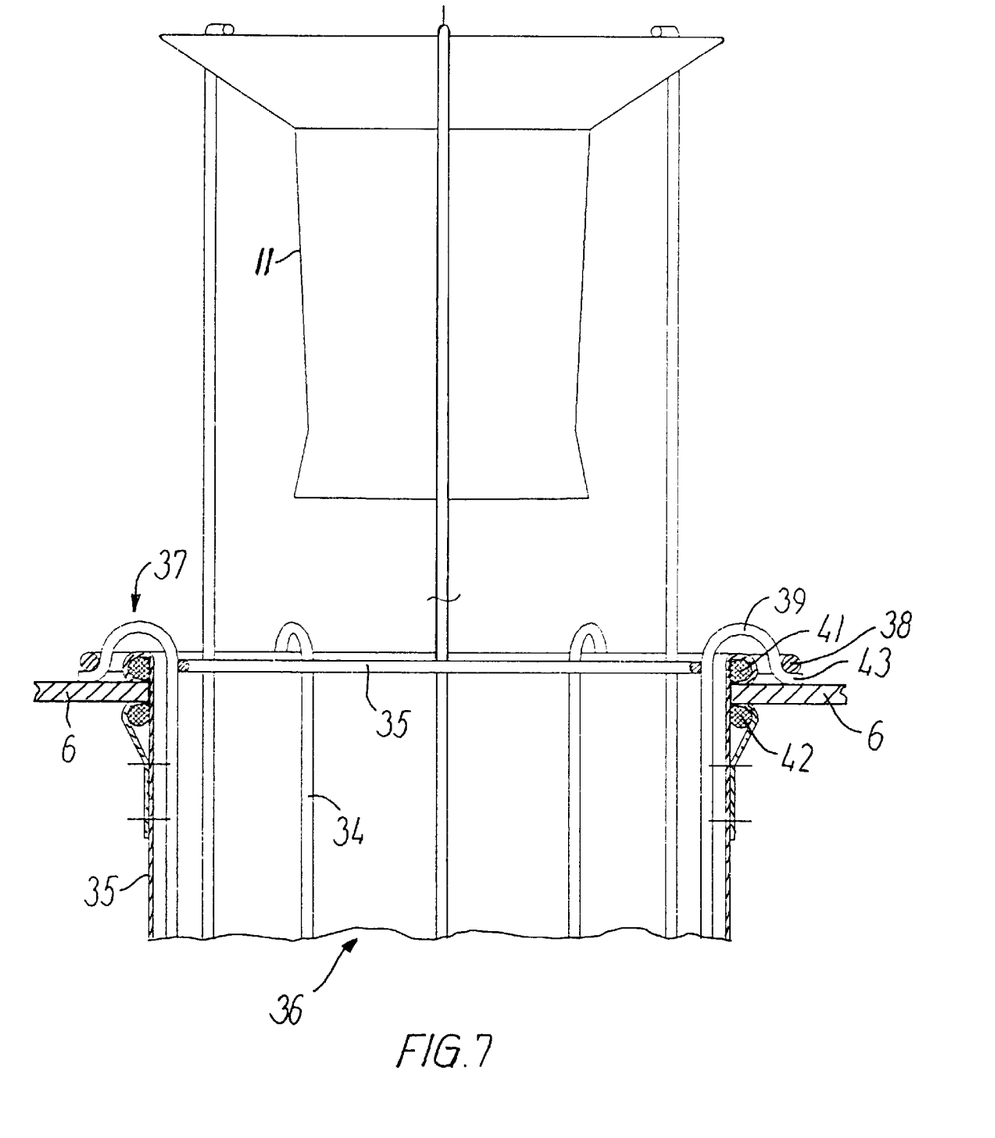
FIG. 7 is a part-sectional view of a filter element mounting and an associated venturi tube.

FIG. 7 shows an embodiment of a filter element mounting according to the invention, which permits drainage of cleaning liquid from the upper surface of the plate 6 (or 32) in a filter unit to the lower side of the plate by capillary effect of filter medium of the filter elements 7. The tubular filter element 7 comprises a soft filter material 33 supported on its inner surface by means of a basket 36 of threads 34 extending in the longitudinal direction of the filter element 7 and being attached to rings 35 of thread. The basket 36 is hanging in a hole in the plate 6 (or 32) by means of an upper collar 37 formed by a ring 38 of thread. The ring 38 has a larger diameter than the hole and is fixed, e.g. by welding, to the upper side of outwards bent end portions 39 of the longitudinal threads 34. Only the tips 43 of the folded end portions 39 are touching the plate 6 and liquid is thus free to ass the collar 37 on the upper surface of the plate 6 and get into contact with the filter wall material.

Some of the longitudinal threads 34 extend straight into the upper outlet side 8 of the filter unit and are carrying the venturi tube 11. It is also possible to position the venturi at a lower level, but the indicated position above plate 6 is preferred in order to obtain full effect of the pulses also in the filter material positioned immediately below plate 6. The filter material 33 is sealed to the edge 40 of the hole in the plate 6 by means of rings 41, 42 of thread enclosed by the material 33 (see FIG. 8). These rings have a slightly smaller inner diameter than the hole and are placed on either side of the plate 6.

Figure 8:
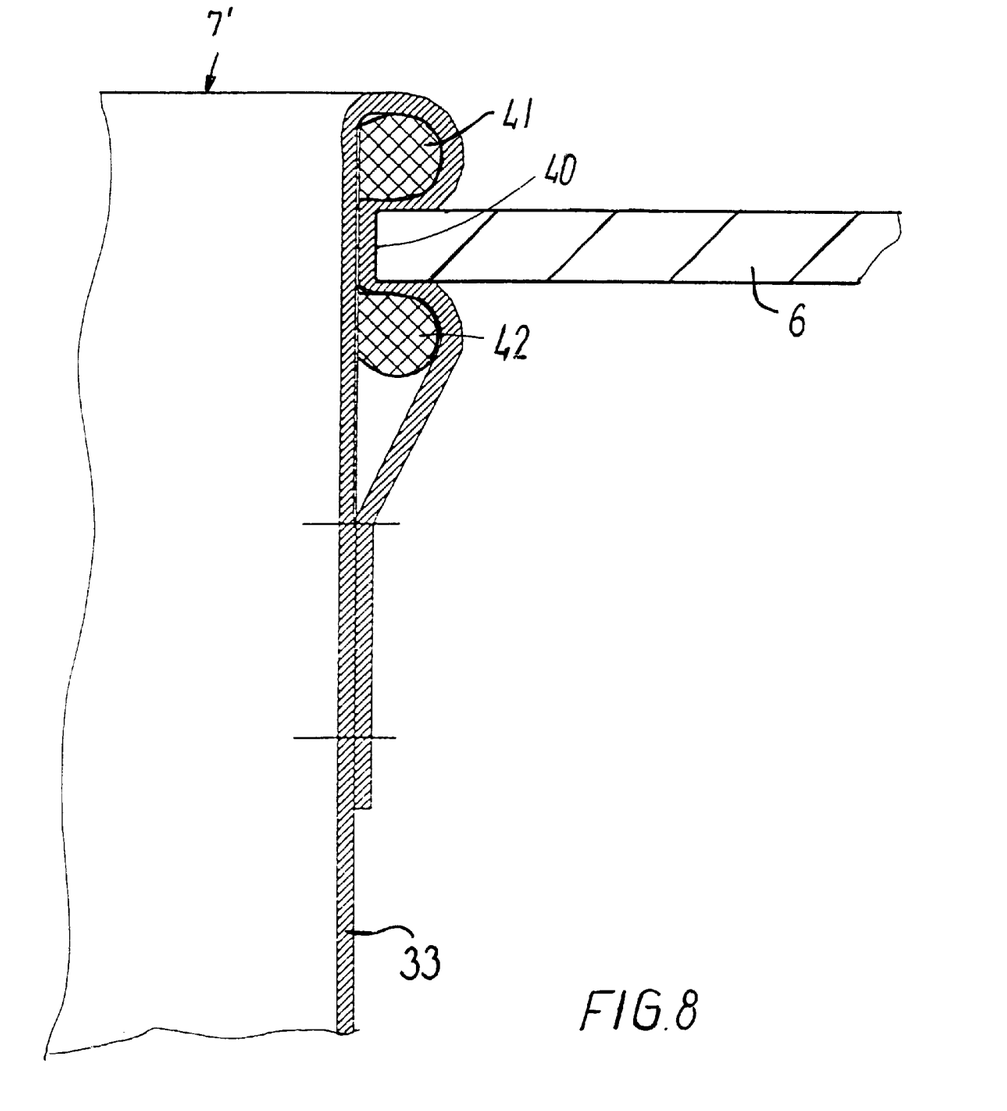
FIG. 8 shows a detail of the filter element mounting in FIG. 7.

The filter material 33 extends straight from beneath the plate 6 through the lower ring 42, the hole in the plate 6, and the upper ring 41, and is then folded around the upper ring 41 to continue back through the hole, and as a result the material 33 is in close contact with the upper surface of plate 6. After having passed through the hole the material 33 is folded around the outer side of the lower ring 42 and is then attached to the outer surface of the filter element 7 as indicated by short lines. The filter material 33 is only compressed between the rings 41, 42 and the plate 6, and a part of the material 33 which extends through the hole is thus free to conduct liquid by capillary effect from the upper surface of the plate 6 to the lower inlet side 9 of the filter unit 1. If it is desired to obtain a larger capillary sucking capacity, the edge 40 can be given a shape deviating from a pure circular shape, it can e.g. be formed with several notches extending radially outwards. Although the above figures and explanation relate to bag-filter elements, the explanations and effects are equally relevant for elements of e.g. metal filter material.

Figure 9:
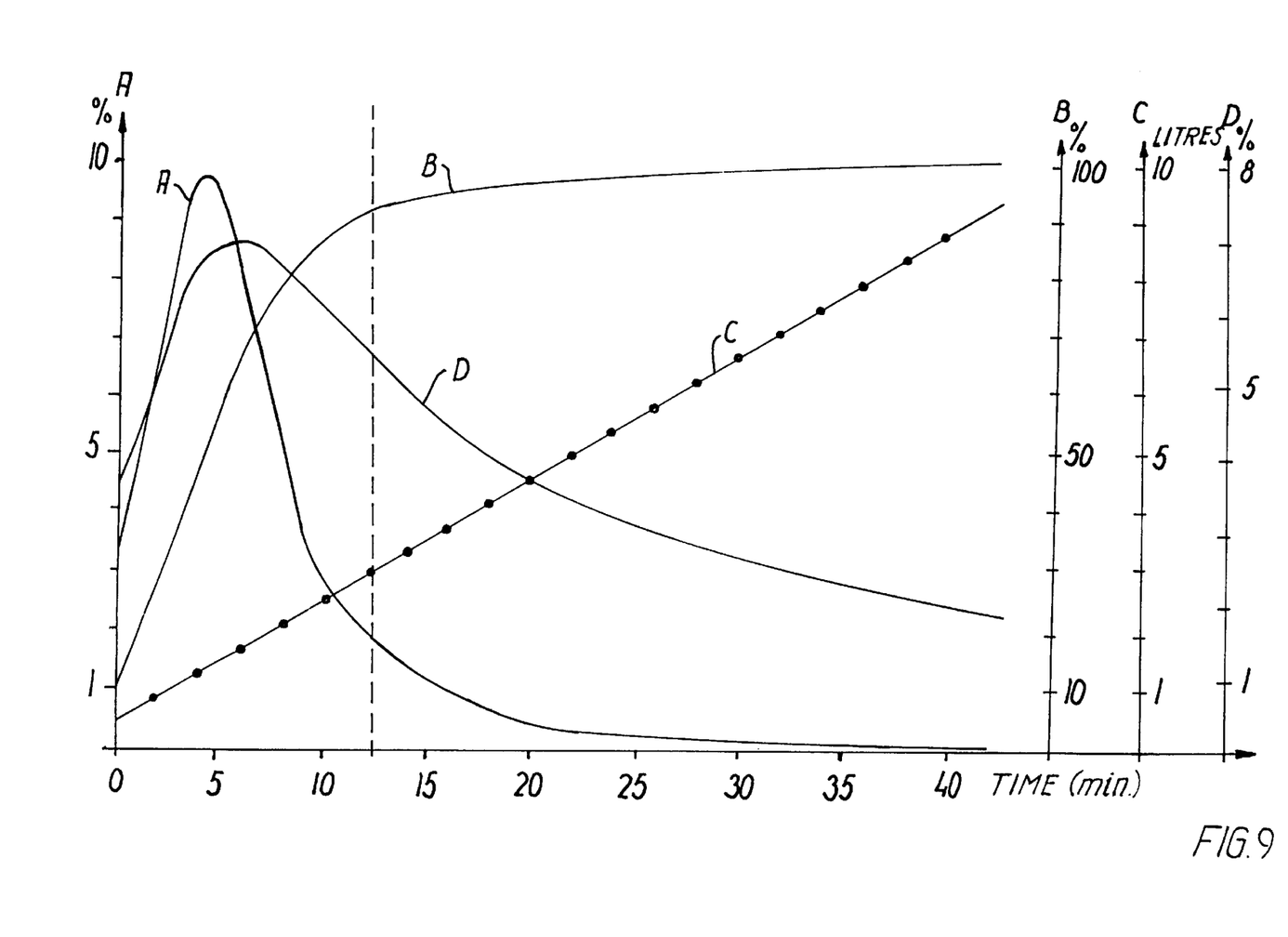
FIG. 9 is a diagram illustrating test data from an example of cleaning-in-place according to the invention.

FIG. 9 illustrates results obtained by carrying out tests of the method of cleaning-in-place according to the invention. The tests were performed with a filter unit comprising two metal filter elements, each with a surface area of 1.58 m² and the filter unit was prepared with 180 g of a heavily colouring dyestuff. The axis of abscisses indicates the duration of the cleaning-in-place operation in minutes and each dot in the diagram significates a common pulse of mixed cleaning liquid and air injected into the interior of the filter elements.

Curve A represents the percentage by weight of dyestuff in each dose of cleaning liquid collected from the individual pulse of cleaning mixture after it has passed through the filter elements. Apparently the curve has its maximum at the third pulse which contained a concentration of as much as 10% by weight of dyestuff. The curve then descends rapidly and the seventh pulse is seen to contain only about 2% by weight of dyestuff.

Curve B represents the current aggregate amount of dyestuff removed from the filter elements indicated in % of the total amount of dyestoff. The curve rises surprisingly fast and after only seven pulses more than 90% by weight of dyestuff were removed from the filter unit.

Each dot of curve C represents a dose of cleaning liquid and the curve itself the aggegate amount of cleaning liquid injected into the filter elements. After 22 pulses with cleaning liquid about all of the dyestuff had been removed from the filter elements and the amount of cleaning liquid stent is seen to be about 9.4 liters corresponding to about 3 liters per square meter of filter wall material.

Curve D represents the current accumulated percentage by weight of dyestuff in the total amount of cleaning liquid having passed through the filter elements.

The above described embodiments can be modified in various manners within the scope of the following claims, it is e.g. possible to perform the cleaning method without use of the mixing chamber, if the gas and the liquid are pulsed concurrently into the venturi and the liquid is ejected via a nozzle ejecting a mist of liquid.

What is claimed is:

1. A method of cleaning a filter unit of the type comprising a plurality of filter elements extending from a plate dividing the unit into a lower inlet side for gas carrying product and an upper outlet side for filtered gas, wherein during a cleaning-in-place of the filter elements in between periods of operation of the filter unit a cleaning liquid is supplied in a sequence of several separate liquid pulses which are mixed with pulses of pressurized gas into common pulses of gas and cleaning liquid by initiating the ejection of the individual pulse of pressurized gas at the earliest time period, simultaneously with or after initiation of ejection of the corresponding pulse of cleaning liquid, wherein each pulse of cleaning liquid has an ejection duration of the most 5 seconds.

2. A method as claimed in claim 1, wherein the amount of cleaning liquid ejected during each separate liquid pulse is less than 1 liter.

3. A method as claimed in claim 2, wherein said amount of cleaning liquid is less than 0.5 liter.

4. A method as claimed in claim 1, wherein the aggregate amount of cleaning liquid pulsed into the filter elements during a complete cleaning-in-place operation is at the most 10 liters per square meter of cleaned filter wall surface.

5. A method as claimed in claim 4, wherein said aggregate amount is less than 5 liters per square meter of cleaned filter wall surface.

6. A method as claimed in claim 1, wherein said ejection duration is in the range of 0.05 to 1 second.

7. A method as claimed in claim 6, wherein said ejection duration is in the range of 0.1 to 0.5 second.

8. A method as claimed in claim 1, wherein each of said gas pulses has a mass, and the cleaning liquid in a single liquid pulse has a mass within the interval of 0.75 to 8 times the mass of gas in the corresponding gas pulse.

9. A method as claimed in claim 1, wherein after having passed through the filter elements the cleaning liquid is collected and the product cleaned from the filter is reclaimed or utilized.

10. A method as claimed in claim 9, wherein the collected cleaning liquid includes at least 2 percent by weight of product cleaned from the filter.

11. A method as claimed in claim 10, wherein the collected cleaning liquid includes at least 4 percent by weight of product cleaned from the filter.

12. A method as claimed in claim 1, wherein only fresh cleaning liquid is used as liquid pulsed into the filter on its outlet side during the entire cleaning-in-place operation.

13. A method as claimed in claim 1, wherein cleaning is performed during operation of the filter unit by supplying first pulses of pressurized gas from the outlet side of the filter to the interior thereof, and by supplying, through nozzles positioned in between the filter elements at the plate dividing the unit, secondary pulses of pressurized gas from the inlet side to the exterior of the upper ends of the filter elements.

14. A method as claimed in claim 13, wherein the secondary pulses are supplied in a sequence controlled independently of a sequence of first pulses.

15. A method as claimed in claim 13, wherein said filter elements have upper ends and an exterior facing said inlet side for gas, and during a cleaning-in-place operation cleaning liquid is supplied from the inlet side to the exterior of the upper ends of the filter elements through nozzles positioned in between the filter elements at the plate dividing the unit.

16. A method as claimed in claim 15, wherein said nozzles are further used for supplying secondary pulses of pressurized gas during operation of the filter unit.

17. A method as claimed in claim 1, wherein cleaning liquid present on an upper surface of the plate dividing the unit after performing a cleaning-in-place operation is drained to a lower side of the plate by capillary effect of filter medium of the filter elements.

18. A method as claimed in claim 1, wherein automatic controlling is used to perform selected pulse sequences.

19. A method of cleaning a filter unit of the type comprising a plurality of filter elements extending from a plate dividing the unit into a lower inlet side for gas carrying product and an upper outlet side for filtered gas, wherein during cleaning-in-place of the filter elements in between periods of operation of the filter unit a cleaning liquid is supplied in a sequence of several separate liquid pulses, and pulses of pressurized gas are supplied, each of said separate liquid pulses being of less than 0.5 liter, said separate liquid pulses supplied to the filter elements during a complete cleaning-in-place operation adding up to an aggregate amount of cleaning liquid of at the most 5 liters per square meter of cleaned filter wall surface.

20. A method as claimed in claim 19, wherein after having passed through the filter elements the cleaning liquid is collected and the product cleaned from the filter is reclaimed or utilized.

21. A method as claimed in claim 20, wherein the collected cleaning liquid includes at least 2 percent by weight of product cleaned from the filter.

22. A method as claimed in claim 21, wherein the collected cleaning liquid includes at least 4 percent by weight of product cleaned from the filter.

23. The method as claimed in claim 19, wherein each of said liquid pulses of cleaning liquid has an ejection duration in the range of 0.1 to 0.5 sec.

* * * * *